(No Model.)

A. MARICHAL.
PUMP.

No. 556,548. Patented Mar. 17, 1896.

Witnesses:

Inventor
Arthur Marichal
Attorney.

UNITED STATES PATENT OFFICE.

ARTHUR MARICHAL, OF BRUSSELS, BELGIUM, ASSIGNOR TO THE SOUTHWARK FOUNDRY AND MACHINE COMPANY, OF PHILADELPHIA, PENNSYLVANIA.

PUMP.

SPECIFICATION forming part of Letters Patent No. 556,548, dated March 17, 1896.

Application filed January 14, 1895. Serial No. 534,786. (No model.)

*To all whom it may concern:*

Be it known that I, ARTHUR MARICHAL, a subject of the King of Belgium, residing at Rue Verte, 135, Brussels, Belgium, have invented a new and useful Improvement in Pumps, of which the following is a true and exact description, reference being had to the accompanying drawings, which form a part thereof.

My invention relates to pumps wherein a piston forces fluid out from a cylinder into a receiver, and has for its object to prevent the breaking of the cylinder-head in pumping water or other incompressible fluid, or a loss of power in pumping air due to the failure of the outlet valve or valves to open at the exact moment when they should.

To this end my invention consists mainly in supplementing a positively-actuated outlet valve or valves which govern the ports which connect the cylinder and receiver by an independent automatically-acting valve or valves governing an independent port or ports, and it also consists in connecting this valve to a suitable piston or diaphragm, so that it will be opened when the pressures in the cylinder or tub and the receiver bear a predetermined relation to each other.

My invention is best described in connection with the accompanying drawings, in which—

Figure 1:
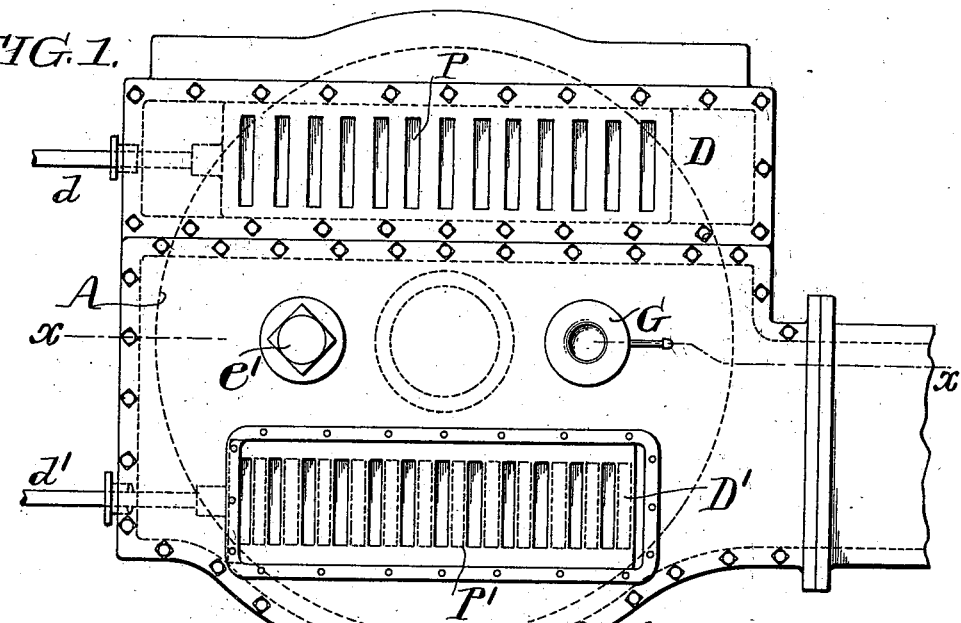
Figure 2:
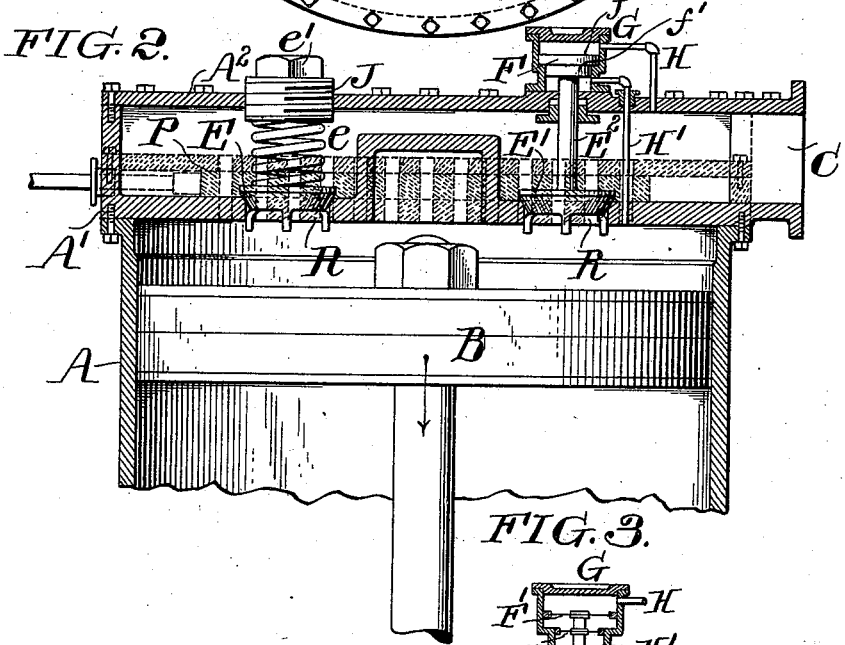
Figure 3:
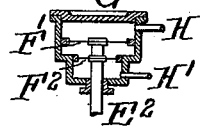

Figure 1 is a top view of a pump provided with my improvements. Fig. 2 is a vertical section on the line $xx$ of Fig. 1, and Fig. 3 is a detail view of a modification.

A is a suitable cylinder, and B a piston operating therein and adapted to force water, air, or other fluid from the cylinder into a receiver, as C.

D is an inlet-valve governing the inlet-ports P and has a stem $d$ through which it is operated in any suitable manner.

D′ is an outlet-valve governing the outlet-ports P′ and is shown as a grid-valve. $d'$ is a valve-stem which is connected to any operative part of the machine, so that the valve will be positively actuated therefrom. Obviously any other sort of a positively-actuated valve can be employed instead of the particular grid-valve shown.

In operating a pump it is very important that the outlet-valve should be opened at precisely the right time, which in the case of air-compressors is when the pressure in the cylinder is substantially equal to that in the receiver. It is also of great advantage to employ as an outlet-valve one positively actuated from some moving part of the machine, so as to obtain the even definite motion which such a connection gives. It is difficult to regulate the time of opening of such a positively-actuated valve so that it will always open when the pressures on each side of it are equal, and the valve may thus remain closed after it should open to permit the flow of fluid from the compressor-cylinder to the receiver. To prevent, therefore, any excess of pressure in the cylinder, I supplement the positively-actuated valve by providing an additional port or ports, as R, and arrange an automatically-operating valve, as E, for governing this port or ports, so that it will open under a determined pressure and prevent excess of pressure in the cylinder during the short period before the positively-actuated valve is opened. At the left of Fig. 2 this valve is shown held to its seat by a spring $e$, which may be adjusted by a screw $e'$ so that the port R will be opened to permit the escape of fluid from the cylinder whenever the pressure therein rises above that in the receiver to a certain amount. Preferably, however, I employ the device shown to the right of Fig. 2, wherein G is a suitable cylinder and F a differential valve operating in said cylinder.

H H′ are conduits for conveying fluid pressure to the different sides of the piston F, the conduit H′ leading from the cylinder to the smaller face $f'$ and the conduit H from the receiver to the larger face $f^2$ of the piston. The piston F is connected to the valve E by means of a stem $E^2$ and will raise it when the pressure in the receiver bears substantially the same ratio to that in the cylinder as the face $f'$ of the piston F bears to the face $f^2$. As it is intended to open the valve E when the pressure in the cylinder exceeds that in the receiver by a very small amount, the substantially balancing pressures on the two sides of the valve E can be disregarded, or the piston F may be made sufficiently larger than this valve so that there will be no need of considering its effect.

It will, of course, be understood that suitable diaphragms can be employed instead of the piston shown. This construction is illustrated in Fig. 3, where $F'$ $F^2$ are two diaphragms of rubber or other suitable material connected to the stem $E^2$ and of substantially the same relative area as the faces $f'$ $f^2$.

Having now described my invention, what I claim as new, and desire to secure by Letters Patent, is—

1. In a pump the combination of a cylinder and piston working therein with a receiving-chamber for fluid forced out from the cylinder, a port or ports connecting the cylinder and receiver, a positively-actuated slide-valve controlling the opening of said ports, a separate port or ports also leading from the cylinder to the receiver and a valve or valves controlling said ports and arranged to move automatically and prevent an excess of pressure in the cylinder during the short period before the positively-actuated valve is opened.

2. In a pump the combination of a cylinder and piston working therein with a receiving-chamber for fluid forced out from the cylinder, a port or ports connecting the cylinder and receiver, a positively-actuated slide-valve controlling the opening of said ports, a separate port or ports also leading from the cylinder to the receiver, a valve or valves controlling said ports, a cylinder as G connected at one end to the receiver and at its other end to the cylinder, and a differential piston working in said cylinder and connected to the valve last mentioned, so that the same will be moved automatically to prevent an excess of pressure in the cylinder during the short period before the positively-actuated valve is opened, all substantially as and for the purpose specified.

ARTHUR MARICHAL.

Witnesses:
GREGORY PHELAN,
GEO. W. ROOSEVELT.